United States Patent [19]

Moritz

[11] Patent Number: 4,669,507

[45] Date of Patent: Jun. 2, 1987

[54] CARRIER FOR ENERGY AND SUPPLY LINES

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 832,814

[22] Filed: Feb. 21, 1986

[30] Foreign Application Priority Data

Mar. 1, 1985 [DE] Fed. Rep. of Germany ....... 3507201

[51] Int. Cl.⁴ ...................... H02G 11/06; F16L 11/18
[52] U.S. Cl. ........................................ 138/92; 59/78.1; 138/120; 174/101; 191/12 C
[58] Field of Search .................. 59/78.1; 138/92, 120; 174/68 C, 86, 89, 101; 191/12 C

[56] References Cited

U.S. PATENT DOCUMENTS

| 1,119,573 | 12/1914 | Byrum | 138/92 |
| 3,330,105 | 7/1967 | Weber | 191/12 C X |
| 3,968,322 | 7/1976 | Taylor | 174/101 X |
| 4,392,344 | 7/1983 | Gordon et al. | 138/120 X |

FOREIGN PATENT DOCUMENTS

| 1910783 | 9/1970 | Fed. Rep. of Germany .... 174/68 C |
| 2622005 | 6/1978 | Fed. Rep. of Germany . |
| 2805832 | 2/1981 | Fed. Rep. of Germany . |
| 2853715 | 6/1981 | Fed. Rep. of Germany . |
| 1502283 | 3/1978 | United Kingdom . |

Primary Examiner—Stephen Marcus
Assistant Examiner—Mark Thronson
Attorney, Agent, or Firm—Becker & Becker, Inc.

[57] ABSTRACT

A carrier for energy lines and other supply lines, with the carrier being disposed between a fixed connection and a movable consuming device. The carrier includes a plurality of interlocking tubular link members that can be bent relative to one another. Inwardly disposed parts are provided with outwardly directed stops, and outwardly disposed parts are provided with inwardly directed stops, with these stops effecting the interlocking of the link members. Each of the link members is U-shaped, and is provided on its open side with inwardly directed projections. A flexible cover strip is inserted between the projections, and spans the opening of the link members in a self-supporting manner.

4 Claims, 4 Drawing Figures

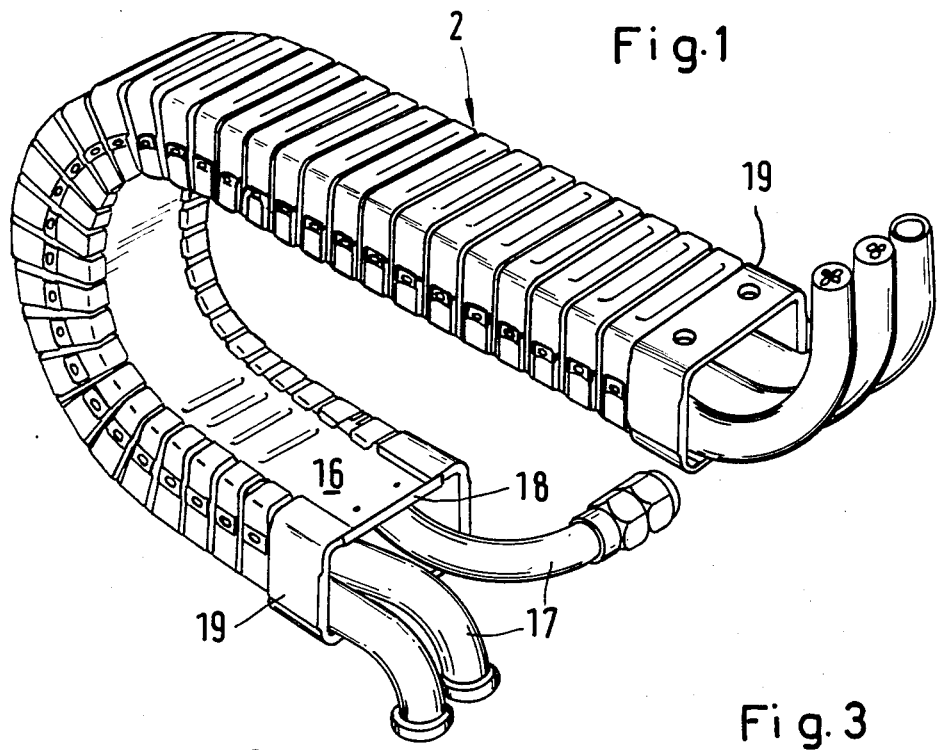
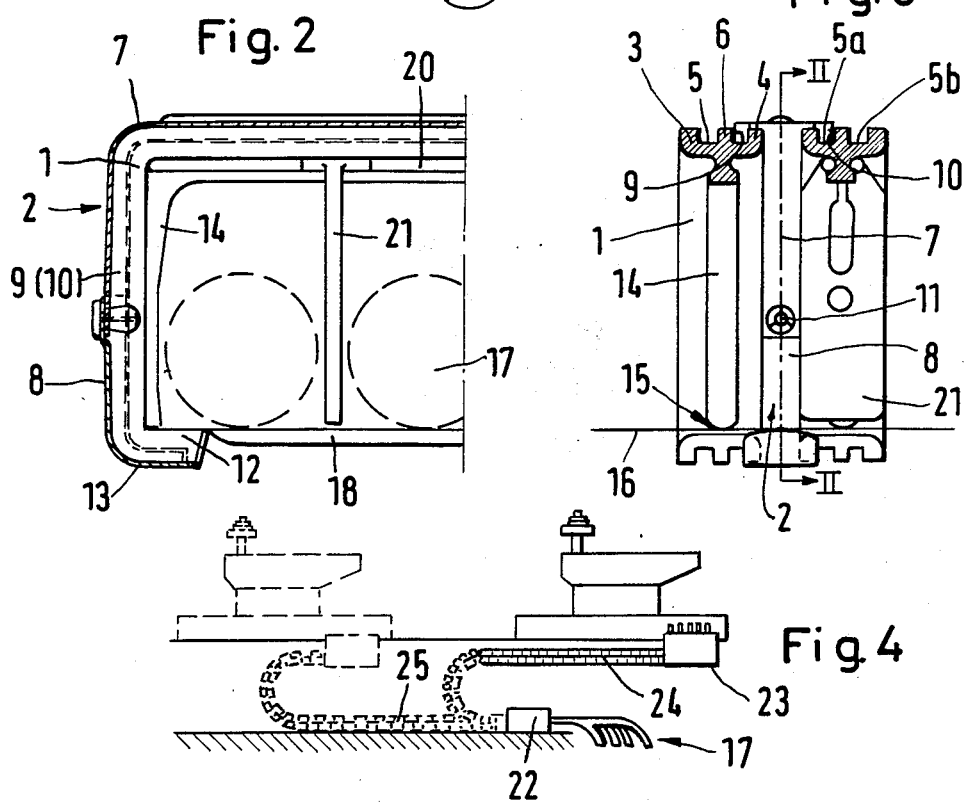

CARRIER FOR ENERGY AND SUPPLY LINES

BACKGROUND OF THE INVENTION

1. Field of the Invention

The present invention relates to a carrier for energy lines and other supply lines, with the carrier being disposed between a fixed connection and a movable consuming device. The carrier includes a plurality of interlocking tubular link members that can be bent relative to one another. Inwardly disposed parts of the link members are provided with outwardly directed stops, and outwardly disposed parts of the link members are provided with inwardly directed stops that interlock with the outwardly directed stops.

2. Description of the Prior Art

German Pat. Nos. 28 05 832 and 28 53 715 disclose energy line carriers of the aforementioned general type. These carriers comprise a series of interlocking tubular link members that can be bent relative to one another. Adjacent ones of these link members interlock via inwardly and outwardly directed stops. The narrower portion forms a circumferential channel, whereas the wider portion is shortened by the width of the channel in the region of half of the cross sectional area in order to structurally limit the two-way pivot angle. With this heretofore known energy line carrier, which forms a closed tube, it is necessary to completely disassemble the carrier in order to replace or exchange the energy lines. In so doing, it is also necessary to disconnect the beginning and end of all of the energy lines, to remove them, and to subsequently reintroduce and reconnect them. As a result, this heretofore known energy line carrier can in practice be used only where it is necessary to replace or exchange individual energy lines only very seldom or not at all.

German Auslegeschrift No. 26 22 006 discloses a guide chain for energy lines that is intended to be disposed between a fixed connection and a movable consuming device. With this heretofore known guide chain, secured between the link members are separable intermediate elements that comprise at least two flanges or straps having flattened cross sections and rounded-off narrow sides, as well as separating webs disposed therebetween. The upper and lower ends of the separating webs have recesses that are provided with undercuts so that the straps, after having been placed into the recesses, can be frictionally and positively connected with the separating webs by rotating the straps about their longitudinal axes. With this heretofore known guide chain, clamps are provided on the ends of the straps in order to be able to insert a cover strip. When with this heretofore known guide chain it is necessary to replace or exchange the energy lines, after the cover strip has been removed, the straps of all of the webs disposed below the cover strip must be opened, and must later again be closed. This takes a considerable amount of time.

An object of the present invention is to provide an energy line carrier that has a simple construction, is provided with tubular link members that can be bent relative to one another, and that can be rapidly opened and again closed for removing or replacing energy lines without thereby having to completely disassemble the carrier.

BRIEF DESCRIPTION OF THE DRAWING

This object, and other objects and advantages of the present invention, will appear more clearly from the following specification in conjunction with the accompanying schematic drawing, in which:

FIG. 1 is a view that shows one inventive embodiment of an energy line carrier;

FIG. 2 is a longitudinal cross-sectional view taken along line II—II in FIG. 3 to show interconnected link members;

FIG. 3 is a cross-sectional view taken through several interconnected link members; and FIG. 4 shows one inventive embodiment of an energy line carrier disposed between a fixed connection and a movable consuming device.

SUMMARY OF THE INVENTION

The energy line carrier of the present invention is characterized primarily in that each of the link members is U-shaped, with a first end of the legs thereof being connected to a crosspiece, and the second end of the legs thereof having an open space between them; the legs and crosspieces are provided with stops that mesh with one another to effect interlocking of adjacent ones of the link members; the second ends of the legs of the link members are provided with projections that extend inwardly toward the projections of opposing legs; a flexible cover strip is disposed between the projections for spanning the open space in a self-supporting manner.

Pursuant to one practical specific embodiment of the present invention, each inwardly disposed link member (as viewed when two link members are interconnected) can be provided with an inwardly projecting rib that is disposed in the central plane of the link member. On the side walls or legs of the inwardly disposed link member, these ribs form slots in conjunction with the aforementioned projections for the insertion of the cover strip. As a further refinement of this embodiment, between the side walls these ribs can be provided with undercuts for securing separating elements that end below the cover strip.

An energy line carrier constructed pursuant to the teaching of the present invention has the advantage that with little manipulation it can be opened over its entire length in order to remove or replace one or more of the energy lines. After such removal or replacement of the energy lines, the carrier can also be readily closed, since it is only necessary to again insert the cover strip to accomplish such closing.

Further advantageous features of the present invention will be described subsequently.

DESCRIPTION OF PREFERRED EMBODIMENTS

Referring now to the drawing in detail, the illustrated energy line carrier comprises an alternating sequence of narrow link members 1 and wide link members 2. The link members 1, 2 are positively connected. In an extended condition of the carrier, the link members 1, 2 can be pivoted toward one another in only one direction, whereas in the same extended condition, these link members form a rigid system in the other three directions.

Each of the narrow link members 1 is U-shaped, and is provided on the outer periphery with stops 3, 4 that form between themselves a channel 5. This channel is divided by a stop ring 6 that is disposed in the central plane of the channel.

In the illustrated embodiment, every second link member, i.e. the link member 2, comprises three parts, namely a U-shaped central portion 7, and two L-shaped end portions 8 that are connected to the legs of the central portion 7. This central portion is wider than the two end portions 8. This shortening of the two end portions 8 relative to the central portion 7 corresponds to the width of the channel 5 of the narrow link member 1. In the illustrated embodiment, the end portions 8 project inwardly on each side by the width of one of the subchannels 5a or 5b. On both sides, the central portion 7 and the end portions 8 are provided with inwardly directed stops 9, 10 that extend into the subchannels 5a and 5b of the narrow link member 1. The end portions 8 are connected to the legs of the central portion 7 via expanding rivets 11. Both of the link members 1 and 2 are provided at the open side with inwardly directed projections 12, 13 respectively. The projections 12 formed on the narrow link members 1 form slots 15 with a rib 14 that is formed on the link member 1 in the central plane thereof and projects inwardly. A flexible cover strip 16 is inserted into the slots 15, and spans the openings of the link members 1, 2 in a cantilever or self-supporting manner. The free ends of the end portions 8 are bent inwardly and extend over the projections 12 so that the legs of the wide link member 2 cannot be bent outwardly.

The narrow link members 1 are preferably made of an insulating material, especially plastic, so that their inner surfaces form a smooth and protective support or contact surface for the energy or transmission lines 17. The wide link members 2 are expediently punched and stamped out of a thin sheet of metal. In this way, it is possible to stamp outwardly projecting beads in the center of the central portion 7 and the end portions 8. Such beads on the one hand increase the inherent stability of the link member, and on the other hand serve as supports for the energy line carrier during use.

The cover strip 16 can be made of plastic or steel, and is provided at its ends with respective transversely extending beads 18 that reinforce the cover strip. These beads 18 can also serve for securing the ends of the cover strip 16 in place, for example by having the beads 18 rest against connectors 19 that are disposed on the end link members of the carrier.

Between the legs of the narrow link member 1, the ribs 14 can be provided with undercuts 20 for securing separating elements 21.

An energy line carrier designed pursuant to the present invention is intended for insertion between a fixed connection 22 and a movable consuming device 23, for example of a machine tool, in order to be able to guide the energy or transmission lines 17 in a protective and tension-relieved manner. In this connection, the upper side 24 of the energy line carrier must be self-supporting so that it does not sag, which could result in undue bending of the energy and transmission lines 17. The lower side 25 of the energy line carrier can be bent only about a predetermined radius that conforms to the permissible bending radius of the most fragile energy or transmission lines 17.

The present invention is, of course, in no way restricted to the specific disclosure of the specification and drawing, but also encompasses any modifications within the scope of the appended claims.

What I claim is:

1. A carrier for energy lines and other supply lines, with the carrier being adapted to be disposed between a fixed connection and a movable consuming device; said carrier comprising:

a plurality of interlocking tubular link members that can be angled relative to one another; each of said link members is U-shaped in a configuration each including a crosspiece interconnecting and a pair of legs each having a first end and a second end as well as having side walls and a central plane respectively therewith, said crosspiece interconnecting said pair of legs with the first end of each of the legs thereof being connected to the crosspiece, and the second ends of each of the legs thereof respectively having and open space located therebetween; said legs and crosspieces being provided with stops that mesh with one another to effect interlocking of said link members adjacent to each other;

projections disposed on said second ends of said legs of said link members and extending inwardly toward each other; and a flexible cover strip that is disposed between said projections in a self-supporting manner for spanning said open space in a fully closed relationship therewith.

2. A carrier according to claim 1, in which one of said link members is disposed inwardly of the other, with said legs and crosspiece of said inwardly disposed link memer having a rib disposed in said central plane, with said rib projecting inwardly and forming respective slots along said side walls with said projections of that same link member for receiving said cover strip.

3. A carrier for energy lines and other supply lines, with the carrier being adapted to be disposed between a fixed connection and a movable consuming device; said carrier comprising:

a plurality of interlocking tubular link members that can be angled relative to one another; each of said link members is U-shaped in a configuration each including a crosspiece and a pair of legs each having a first end and a second end as well as having side walls and a central plane respectively therewith, said crosspiece interconnecting said pair of legs with the first end of each of the legs therof being connected to the crosspiece, and the second ends of each of the legs thereof respectively having an open space located therebetween; said legs and crosspieces being provided with stops that mesh with one another to effect interlocking of said link members adjacent to each other;

projections disposed on said second ends of the said legs of said link members and extending inwardly toward each other; and a flexible cover strip that is disposed between said projections in a self-supporting manner for spanning said open space in a fully closed relationship therewith; one of said link members being disposed inwardly of the other, with said legs and said crosspiece of said inwardly disposed link members having a rib disposed in said central plane, with said rib projecting inwardly and forming respective slots along said side walls with said projections of that same link member for receiving said cover strip; said rib also being disposed in said central plane of said inwardly disposed link member, with said rib on said crosspiece being provided with undercuts and separating elements secured to said rib on said crosspiece via said undercuts.

4. A carrier according to claim 3, in which said second ends of said outwardly disposed link member are bent inwardly toward one another and interlock with said projections of said inwardly disposed link member.

* * * * *